United States Patent
Libby et al.

(10) Patent No.: US 7,695,012 B2
(45) Date of Patent: Apr. 13, 2010

(54) AIRBAG SYSTEMS WITH A SPLIT POCKET

(75) Inventors: Anna Libby, Lake Orion, MI (US);
Kristy Brouwer, Macomb, MI (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 12/062,383

(22) Filed: Apr. 3, 2008

(65) Prior Publication Data

US 2009/0250912 A1 Oct. 8, 2009

(51) Int. Cl.
B60R 21/16 (2006.01)
B60R 21/205 (2006.01)
B60R 21/231 (2006.01)

(52) U.S. Cl. .................. 280/743.1; 280/729; 280/732; 280/743.2

(58) Field of Classification Search ............. 280/729, 280/732, 743.1, 743.2, 730.1
See application file for complete search history.

(56) References Cited

U.S. PATENT DOCUMENTS

| | | | |
|---|---|---|---|
| 5,129,675 A | 7/1992 | Wang | |
| 5,310,214 A | 5/1994 | Cuevas | |
| 5,945,184 A | 8/1999 | Nagata et al. | |
| 6,454,300 B1 | 9/2002 | Dunkle et al. | |
| 6,536,800 B2 | 3/2003 | Kumagai et al. | |
| 6,749,217 B2 | 6/2004 | Damian et al. | |
| 6,832,780 B2 | 12/2004 | Amamori | |
| 6,846,008 B2* | 1/2005 | Kamiji et al. | 280/729 |
| 7,000,947 B2 | 2/2006 | Kumagai et al. | |
| 7,052,042 B2* | 5/2006 | Sato et al. | 280/743.1 |
| 7,131,664 B1 | 11/2006 | Pang et al. | |
| 7,152,880 B1 | 12/2006 | Pang et al. | |
| 7,192,053 B2 | 3/2007 | Thomas | |
| 7,243,947 B2* | 7/2007 | Bosch | 280/743.1 |
| 7,350,807 B2 | 4/2008 | Schneider et al. | |
| 7,396,043 B2* | 7/2008 | Choi et al. | 280/743.1 |
| 7,484,757 B2* | 2/2009 | Thomas et al. | 280/743.2 |
| 2001/0033072 A1 | 10/2001 | Kumagai et al. | |
| 2002/0063416 A1 | 5/2002 | Kamaiji et al. | |
| 2002/0175511 A1 | 11/2002 | Dunkle et al. | |
| 2003/0230883 A1 | 12/2003 | Heym | |
| 2004/0164526 A1 | 8/2004 | Hasebe et al. | |
| 2004/0232681 A1* | 11/2004 | Adomeit | 280/743.1 |
| 2005/0035582 A1 | 2/2005 | Kim | |
| 2005/0077708 A1 | 4/2005 | Sollars | |
| 2005/0098994 A1 | 5/2005 | Matsumura | |
| 2005/0161918 A1 | 7/2005 | Bito | |

(Continued)

FOREIGN PATENT DOCUMENTS

JP 2001/030863 6/2001

(Continued)

*Primary Examiner*—Ruth Ilan
*Assistant Examiner*—James English
(74) *Attorney, Agent, or Firm*—Sally J Brown; Stoel Rives LLP

(57) ABSTRACT

The airbag assembly features an inflatable cushion having a split pocket at its lower portion and may also include a recess in its lower portion. The split pocket and recess allows the cushion to receive a rear-facing child car seat during deployment. The airbag assembly may further include a tethering system to control deployment of the pocket and the split sections of the cushion.

26 Claims, 11 Drawing Sheets

U.S. PATENT DOCUMENTS

| | | |
|---|---|---|
| 2006/0028009 A1 | 2/2006 | Hasebe et al. |
| 2006/0049618 A1 | 3/2006 | Bito |
| 2006/0103118 A1 | 5/2006 | Hasebe |
| 2006/0186647 A1 | 8/2006 | Bosch |
| 2006/0197318 A1 | 9/2006 | Choi et al. |
| 2006/0249934 A1 | 11/2006 | Hasebe |
| 2006/0267323 A1 | 11/2006 | Schneider et al. |
| 2007/0024032 A1 | 2/2007 | Hasebe |
| 2007/0040358 A1 | 2/2007 | Kismir |
| 2007/0182143 A1 | 8/2007 | Wright |
| 2007/0200320 A1 | 8/2007 | Keshavaraj |
| 2007/0262572 A1 | 11/2007 | Fischer et al. |
| 2007/0290489 A1 * | 12/2007 | Aranzulla et al. ........... 280/732 |

FOREIGN PATENT DOCUMENTS

| | | |
|---|---|---|
| JP | 2005/247118 | 9/2005 |
| JP | 2005/280470 | 10/2005 |

* cited by examiner

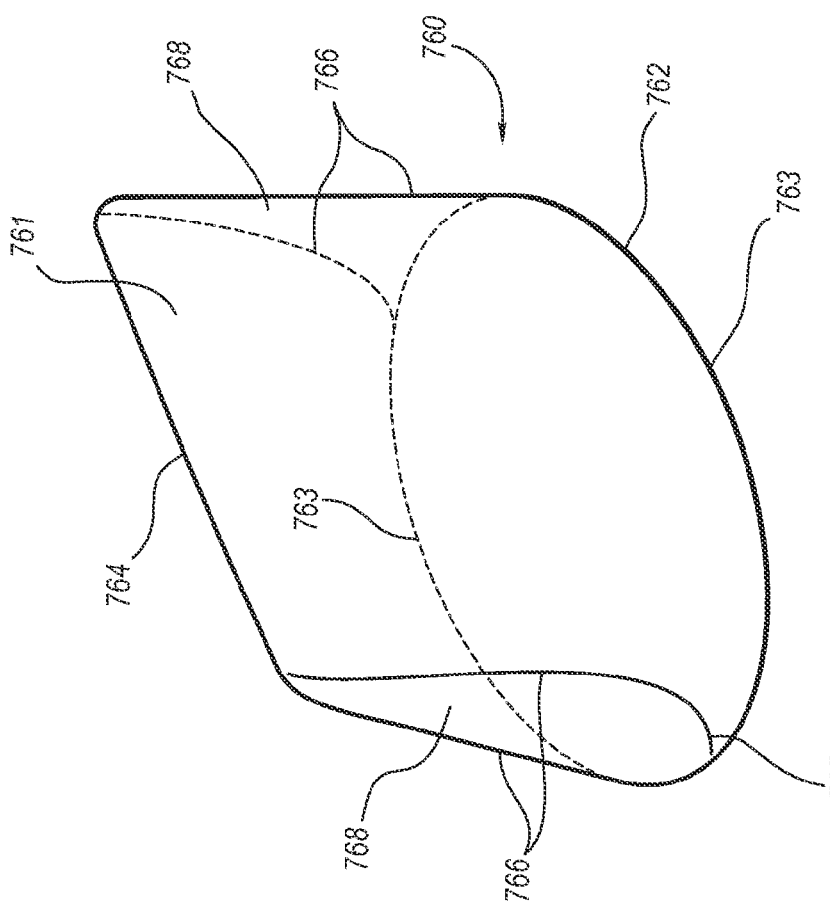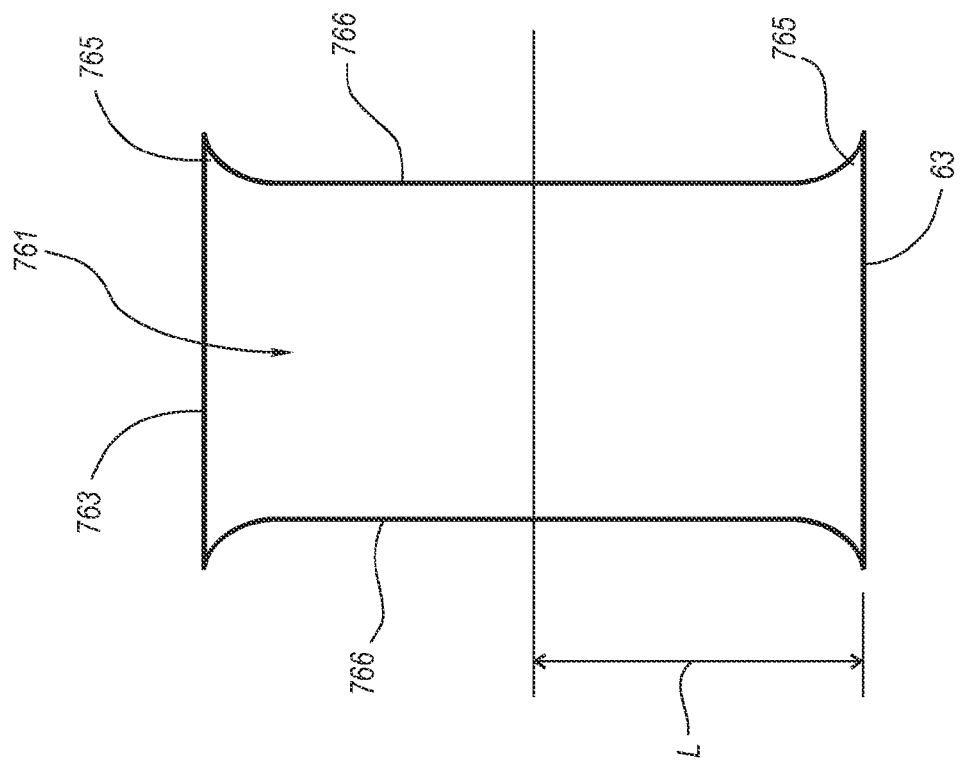

AIRBAG SYSTEMS WITH A SPLIT POCKET

TECHNICAL FIELD

The present disclosure relates generally to the field of automotive protective systems. More specifically, the present disclosure relates to passenger airbag systems designed to minimize interaction with vehicular occupants in child car seats.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments, and are, therefore, not to be considered to be limiting of the invention's scope, the embodiments will be described and explained with specificity and detail in reference to the accompanying drawings in which:

FIG. 11A is a front elevation view of a piece of material that can form the split pocket of FIG. 9;

FIG. 11B is a perspective view of the split pocket of FIG. 9; and,

Figure 1:
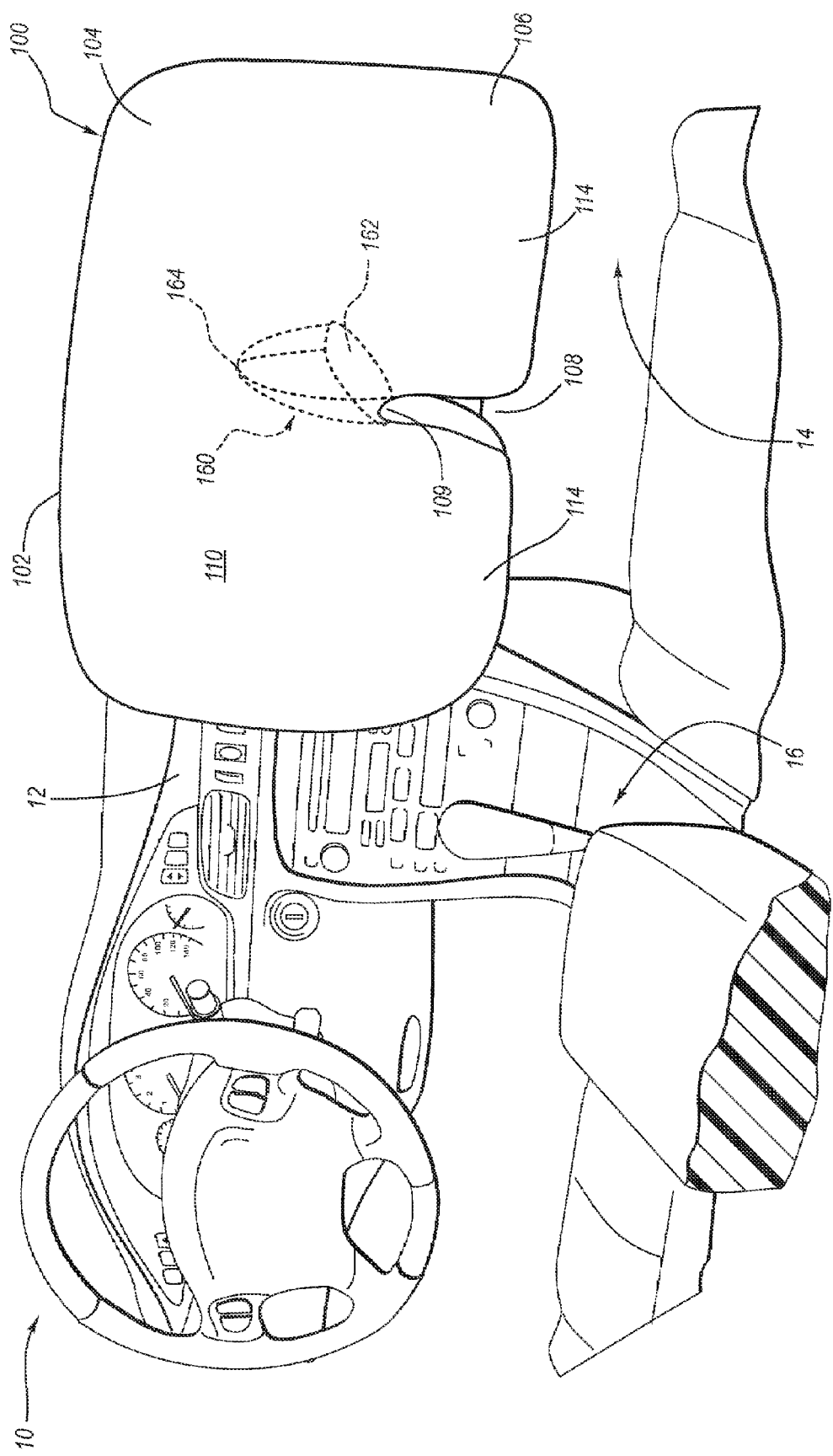
FIG. 1 is a perspective view from inside a vehicle of one embodiment of a passenger-side airbag in a deployed state.

INDEX OF ELEMENTS IDENTIFIED IN THE DRAWINGS 10 vehicle
12 instrument panel
14 outboard side of vehicle
16 inboard side of vehicle
18 passenger side seat
20 cavity in instrument panel
22 upper portion of child car seat
24 child car seat
26 out of position occupant
27 head of out of position occupant
100 airbag
102 airbag cushion
104 upper portion of cushion
106 lower portion of cushion
108 recess
109 top of recess
110 front face of cushion
114 split sections
160 split pocket
162 split pocket opening
164 top portion
200 airbag
202 airbag cushion
206 lower portion of cushion
208 recess
210 front face of cushion
212 rear face of cushion
260 split pocket
264 upper portion of pocket
300 airbag
302 airbag cushion
306 lower portion of cushion
308 recess
310 front face of cushion
312 rear face of cushion
314 split sections
316 front panel
318 rear panel
320 divider panels
322 top edges
360 split pocket
400 airbag
402 airbag cushion
406 lower portion
408 recess
409 top of recess
412 rear face
414 split sections
430 tethering system
432 first tether
434 first end of first tether
436 second end of first tether
438 stitching
440 second tether
442 first end of second tether
444 second end of second tether
446 third tether
448 first end of third tether
450 second end of third tether
452 fourth tether
453 pocket tether
454 first end of pocket tether
455 second end of pocket tether
460 split pocket
464 top portion of pocket
500 airbag
502 airbag cushion
506 lower portion of cushion
508 recess
509 top of recess
510 front face
512 rear face
514 split section
530 tethering system
532 first tether
538 stitching
553 first pocket tether
554 first portion of first pocket tether
555 second portion of first pocket tether
556 second pocket tether
557 first portion of second pocket tether
558 second portion of second pocket tether 560 split pocket
562 split pocket opening
564 top portion of split pocket
600 airbag
602 airbag cushion
604 upper portion of cushion
606 lower portion of cushion
608 recess
609 top portion of recess
610 front face of cushion
614 split sections
624 inboard side of cushion
625 outboard side of cushion
660 split pocket
662 split pocket opening
664 top portion of split pocket
700 airbag
702 airbag cushion
704 upper portion of cushion
706 lower portion of cushion
710 front face of cushion
713 bottom face of cushion
724 inboard face of cushion
725 outboard face of cushion
753 first pocket tether
754 first portion of first pocket tether
755 second portion of first pocket tether
756 second pocket tether
757 first portion of second pocket tether
758 second portion of second pocket tether
760 split pocket
761 split pocket material
762 split pocket opening
763 opposing edges of material
764 top portion of pocket
765 flanges of material
766 sides of material
768 end portions of pocket
770 vents
800 airbag
802 airbag cushion
810 front face of cushion
825 outboard face of cushion
853 first pocket tether
856 second pocket tether
860 split pocket
862 pocket opening
864 top portion of pocket
868 end portions of pocket
870 vents

DETAILED DESCRIPTION OF PREFERRED EMBODIMENTS

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the invention, as claimed, but is merely representative of various embodiments. While the various aspects of the embodiments are presented in drawings, the drawings are not necessarily drawn to scale unless specifically indicated.

The phrases "connected to," "coupled to" and "in communication with" refer to any form of interaction between two or more entities, including mechanical, electrical, magnetic, electromagnetic, fluid, and thermal interaction. Two components may be coupled to each other even though they are not in direct contact with each other. The term "abutting" refers to items that are in direct physical contact with each other, although the items may not necessarily be attached together.

FIG. 1 represents one embodiment of an airbag 100 in a deployed state, as shown from a perspective view from inside a vehicle 10. The airbag 100 may be a passenger-side airbag 100 that is configured to deploy from an instrument panel 12. The airbag 100 is an inflatable cushion 102 that is configured to be rapidly inflated by an inflator (not shown), such as a pyrotechnic inflator. The inflator rapidly produces inflation gas to fill the inflatable cushion 102 when activated by a collision sensor system (not shown).

According to the embodiment depicted in FIG. 1, the cushion 102 has an upper portion 104 and a lower portion 106. The upper portion 104 of the cushion 102 is the portion of the cushion 102 closest to the headliner of the vehicle 10 when the airbag 100 is in its deployed state. The lower portion 106 is below the upper portion 104 when the airbag 100 is in its deployed state, and is closest to the floor of the vehicle 10. The term "lower portion" is not necessarily limited to the portion of the cushion 102 that is below a horizontal medial plane of the cushion 102, but may include less than half, more than half or exactly half of the bottom portion of the airbag 100. The term "upper portion" is also not necessarily limited to the portion of the cushion 102 that is above a horizontal medial plane of the cushion 102, but may include less than half, more than half or exactly half of the top portion of the airbag 100.

Disposed in the lower portion 106 of the cushion 102 is a recess 108 that may extend through the entire cushion 102, from its front face 110 to a rear face (not shown). Alternatively, the recess 108 may extend from the front face 110 toward the rear, but not extend completely to the rear face. Alternatively, recess 108 may be partially formed in the front face and extend all the way to the rear face, wherein the recess is partially formed in the rear face also. Further, the recess may be partially formed in the rear face and extend toward but not all the way through to the front face. In the depicted embodiment, the recess 108, however, does not extend through the entire upper portion 104 of the cushion 102. The recess 108 may be created through a structure, such as stitching in the fabric of the cushion 102.

The recess 108 may be shaped to receive a child's head located in the upper portion of a rear-facing child car seat that is placed in the passenger seat of vehicle 10. Recess 108 may also receive a portion of the child car seat. In this way, interaction between an occupant in the child car seat and a deploying airbag cushion 102 may be minimized.

The recess 108 divides the lower portion 106 of the cushion 102 into split sections 114. One of the sections is on the outboard side 14 of the vehicle 10, and the other is on the inboard 16 side of the vehicle 10. The split sections 114 are configured to minimize interaction between the cushion 102 and the head of an occupant in the rear-facing child car seat. This is accomplished by the split sections 114 deploying on either side of the child car seat, and the car seat being received by the recess 108. The deployment of the split portion 114 may optionally be controlled by a tethering system, such as an internal tethering system.

Recess 108 is partially defined by a top portion 109, which may comprise a seam or a top panel. Alternatively, top portion 109 may represent a contiguous extension of split portions 114, which are also the sides of recess 108, such as may result if cushion 102 were manufactured using a one piece weaving technique.

Cushion 102 further comprises a split pocket 160, which is configured to extend the depth of recess 108, while allowing cushion 102 to maintain a predetermined conformation during deployment. Split pocket 160 further comprises an opening 162, and a top portion 164. Split pocket 160 may be formed by sewing a different piece of material into a cut-out of cushion 102, wherein the cut-out is made in top portion 109 of recess 108. In the depicted embodiment, split pocket 160 is oval shaped with a long axis of the oval running approximately perpendicular to front face 110. In alternative embodiments, the shape of the split pocket opening could be any shape, including square or rectangular, and the long axis of the opening may run parallel to the front face of the cushion. Split pocket 160 may comprise a full length, or part of the full length of recess 108, from front to back. The length, width, and depth of split pocket 160 can vary. By way of example, and not by way of limitation, in one embodiment, when the cushion is in an un-inflated state split pocket 160 comprises the following dimensions: about 13 inches in the X plane, about 16 inches in the Y plane, and about 0 inches in the Z plane. In an inflated state, pocket 160 comprises about 13 inches in the X plane, about 4 inches in the Y plane, and about 6 inches in the Z plane. As will be appreciated by those skilled in the art, the shape and orientation of both split pocket 160 and opening 162 may vary according to different embodiments.

Opening 162 is contiguous with recess 108 and is configured to further minimize interaction between cushion 102 and the head of an occupant in the rear-facing child car seat. This is accomplished by split sections 114 deploying on either side of the child's head and the child's head being received by recess 108 and by split pocket 160. A portion of the child car seat may also be received by recess 108. Opening 162 may comprise the full length (front to back) of recess 108 or a portion of the full length of the recess. Top portion 164 of split pocket 160 may comprise an arch shaped cross-section, and may be defined by an additional piece of material sewn into split pocket 160.

Figure 2:
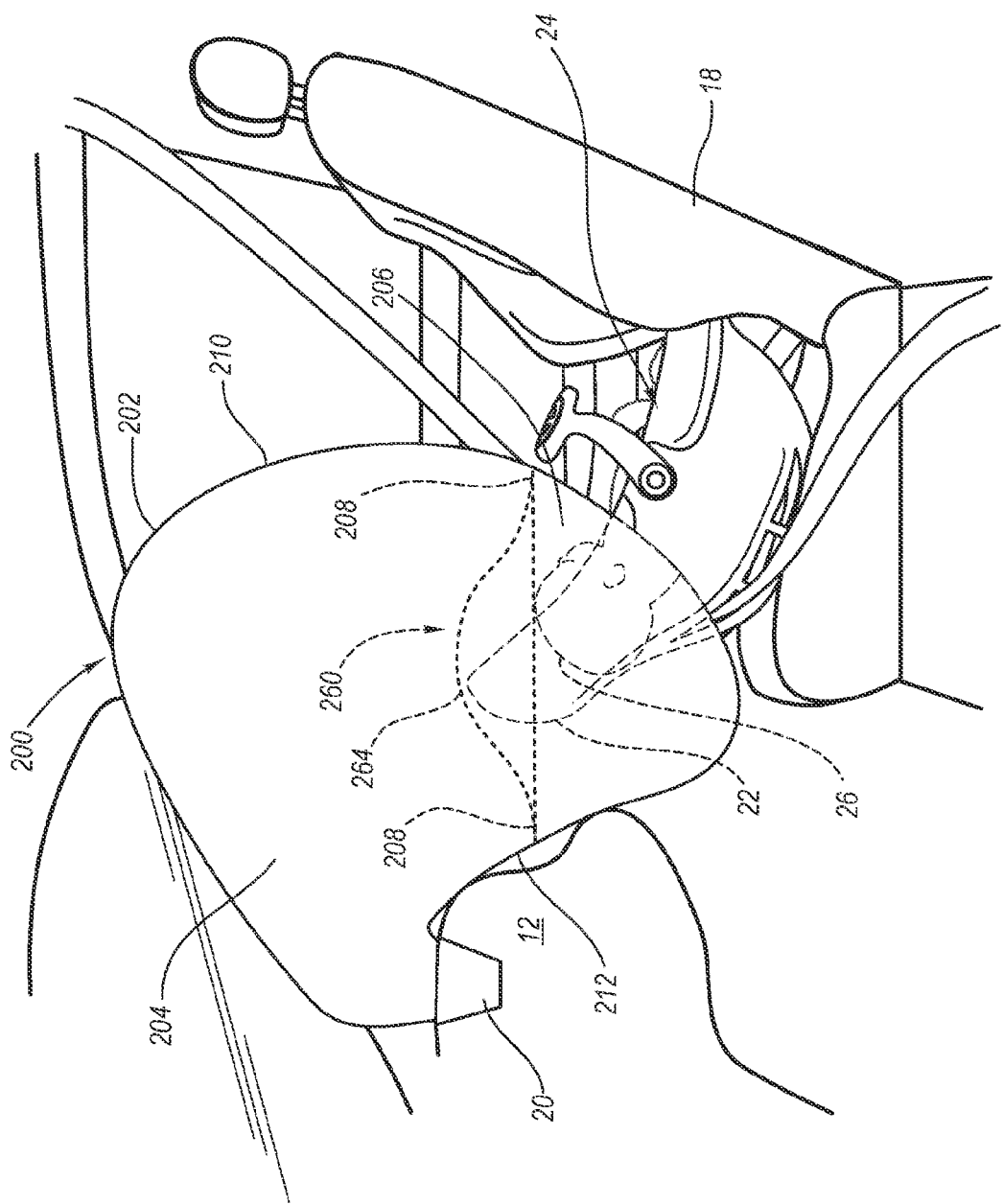
FIG. 2 is a side elevation view from inside a vehicle of another embodiment of a passenger-side airbag in a deployed state.

FIG. 2 represents a passenger-side airbag 200 as shown from a side elevation view in a deployed state. Airbag assembly 200 comprises an inflatable cushion 202 that may deploy out of an instrument panel 12 toward an intended occupant position in a passenger seat 18. The airbag 200 may be stored inside a cavity 20 in the instrument panel 12 when in an uninflated state.

When the inflatable cushion 202 deploys, a recess 208 and a split pocket 260 located in a lower portion 206 of the cushion receives the head and/or upper body of an occupant in the child seat, as well as possibly receiving an upper portion 22 of the rear-facing child car seat 24. Recess 208 may extend from a front face 210 of the cushion to a rear face 212 and split pocket 260 may comprise a portion of the full length of the recess. Accordingly, interaction between the cushion 202 and an occupant 26 in the child car seat 24 is minimized because of the location of recess 208 and pocket 260 in the lower portion 206. Upper portion 22 of the car seat 24 may or may not be fully received by split pocket 260, such that portion 22 may or may not contact top portion 264 of split pocket 260. Recess 208 and split pocket 260 may significantly reduce the potential injury to the out-of-position occupant 26. Furthermore, alternative methods known in the art to reduce membrane loading of a deploying cushion 202 may be used in combination with the embodiments disclosed herein, such as one or more dynamic vents, which may be opened or closed depending on occupant cushioning requirements, or special cushion folding patterns and the like.

An upper portion 204 of the inflatable cushion 202 does not have a recess disposed there through in order to provide sufficient impact protection for occupants not sitting in a child car seat 24. Furthermore, restricting the recess to the lower portion 206 may help to prevent too much penetration into the cushion 202 and possible occupant strikethrough if the recess existed in the upper portion 204 of the cushion 202.

Figure 3:
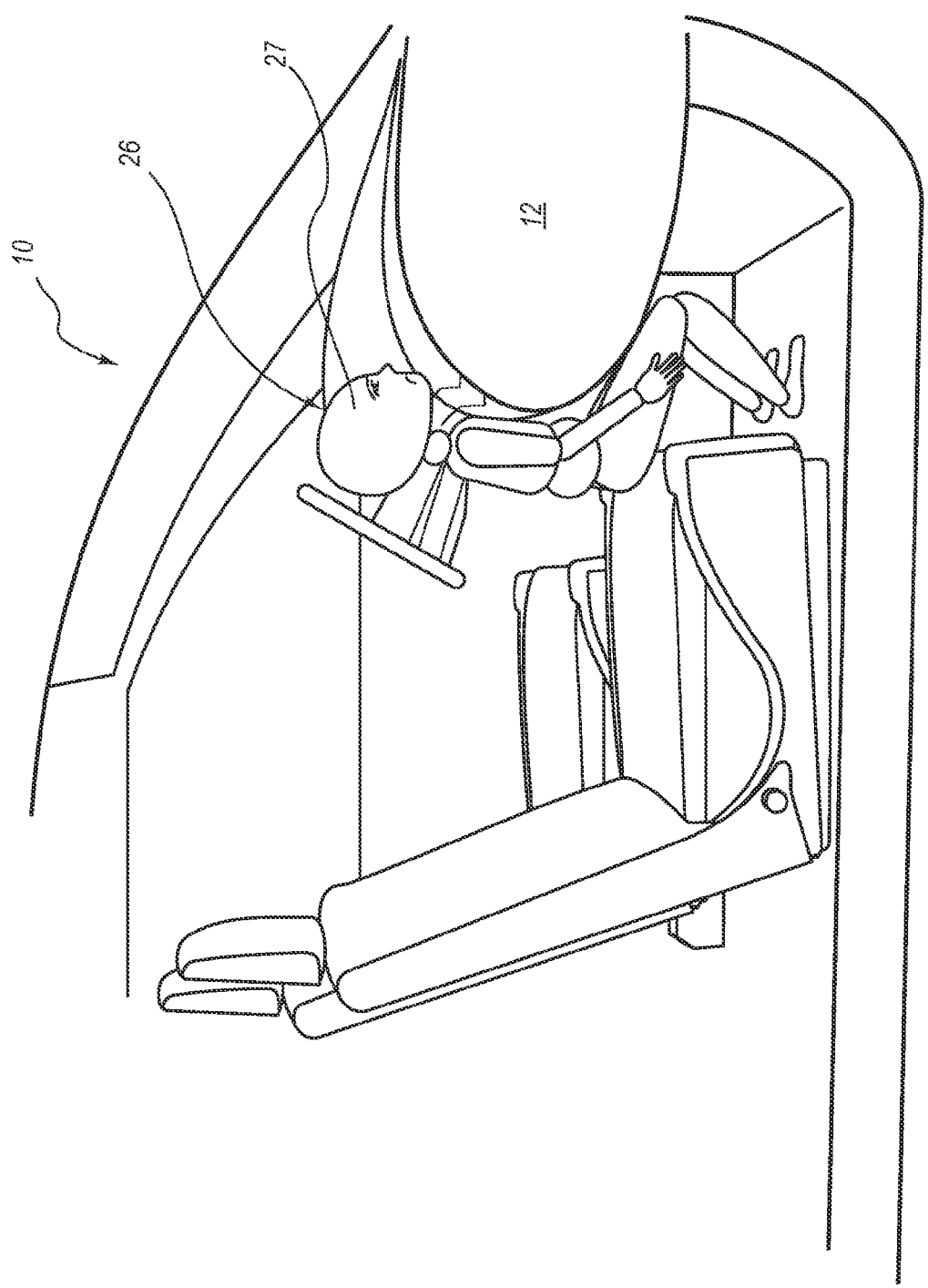
FIG. 3 is a perspective view of a vehicle, in which a passenger is out of position.

In addition to potentially minimizing compression loads on the head and neck of an occupant of a rear facing child car seat, as depicted in FIG. 2, airbag cushion assemblies as described herein may reduce compression loads on other out of position occupants. FIG. 3 is a side elevation view of a vehicle 10, wherein an occupant 27 is out of position such that a head 27 of the occupant may be resting on or in close proximity to an instrument panel 12, from which an inflatable cushion may deploy. Occupant 26 is depicted as having a small stature, such as a child or small adult; however, the occupant may represent any age or size of occupant that has their head in a similar position. In one example, occupant 26 may be a 6 year old or 3 year old crash dummy in the out of position occupant number 2 (OOP2) condition of the Federal Vehicle Motor Safety Standard 208.

The inflatable airbag cushions described herein are configured such that they may reduce compression loads on the head and neck of an out of position occupant, especially those in rear facing child car seats, or with their heads in close proximity to the instrument panel from which the cushion may deploy. The cushions as described herein reduce compression loads on the head and neck, which may also be described as minimizing the interaction between the head of an occupant and the airbag cushion. The cushions reduce compression loads by receiving a portion of the head of the out of position occupant into the pocket and/or split of the cushion.

Figure 4:
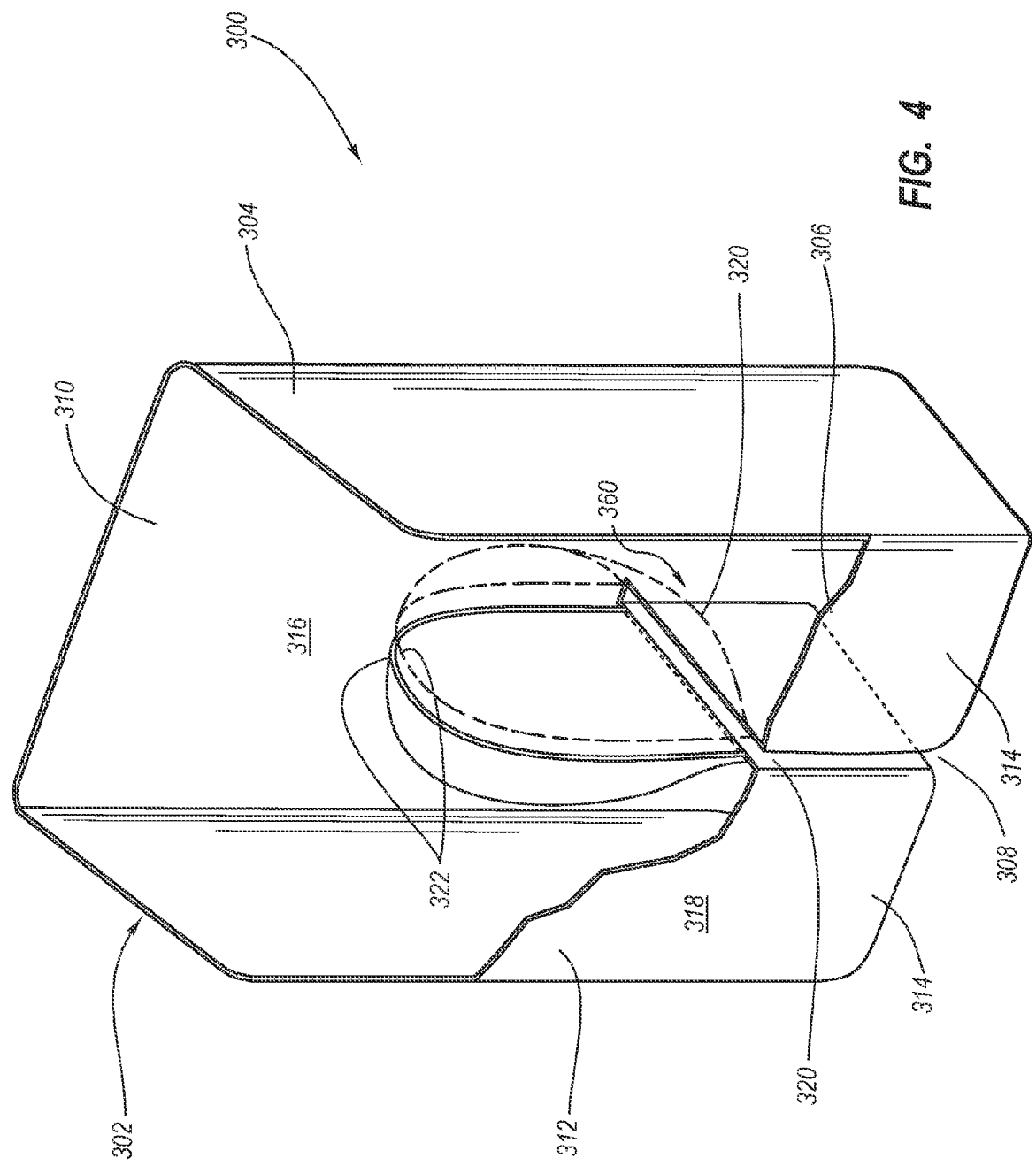
FIG. 4 is a partially cut away perspective view of one embodiment of a divided airbag.

FIG. 4 represents an embodiment of a divided airbag system 300 from a partially cut-away perspective view. The divided airbag system 300 includes an inflatable cushion 302 that has a front face 310 and a rear face 312. The front face 310 is configured to be closest to an intended occupant position when deployed, whereas the rear face 312 is configured to be closest to an instrument panel when the cushion 302 is deployed.

The front face 310 may include a front panel 316 and the rear face 312 may include a rear panel 318. The panels 316, 318 may be constructed of fabric or alternative construction as known to those having skill in the art. The panels 316, 318 may be separate panels that are attached together through stitching or the like, or alternatively, may be opposite facing portions of a single fabric piece that is sewn together along its sides to form an inflatable cushion.

In a lower portion 306 of the cushion 302, a recess 308 is formed, extending from the rear panel 318 to the front panel 316. The recess 308 defines split sections 314 in the lower portion 306 of the cushion 302. The recess 308 may be formed from a structure, such as divider panels 320 that extend from the base of the cushion 302 towards the cushion top, but terminate before reaching the top, such that an upper portion 304 of the cushion 302 is not divided into split sections. The divider panels 320 may be panels that are attached to the cushion 304 through sewing, bonding, RF welding and the like, or alternatively, may be an integral part of the cushion 304 material that is folded and attached in such a manner as to form the recess 308 in the lower portion 306 of the cushion.

Split pocket 360 may be partially formed by divider panels 320, or alternatively, the one or more pieces of material that define the split pocket may be sewn or otherwise attached to divider panels 320. In alternative embodiments, wherein recess 308 is formed within cushion 302 without the use of divider panels 320, split pocket 360 may comprise a cut-out of a bottom surface of cushion 310 into which has been sewn one or more pieces of material, which define the split pocket.

Top edges 322 represent the top of each of the divider panels 320 or of split pocket 360, depending on where in the cushion the edges are disposed. Edges 322 of divider panels 320 are attached to each other and merged through stitching or through alternative methods of attachment known to those having skill in the art. FIG. 4 shows the top edges 322 before being stitched together. The stitched together top edges 322 define where the recess 308 terminates, and also may comprise part of the structure that defines the recess 308.

The front panel 316 may span across the recess 308, interconnecting the split sections 314 in the lower portion 306 of the cushion 302, while the rear panel 318 may not span the split sections 314. Alternatively, the front panel may be shaped to allow the recess 308 to run there through, similar to the embodiment discussed in conjunction with FIG. 1.

Figure 5:
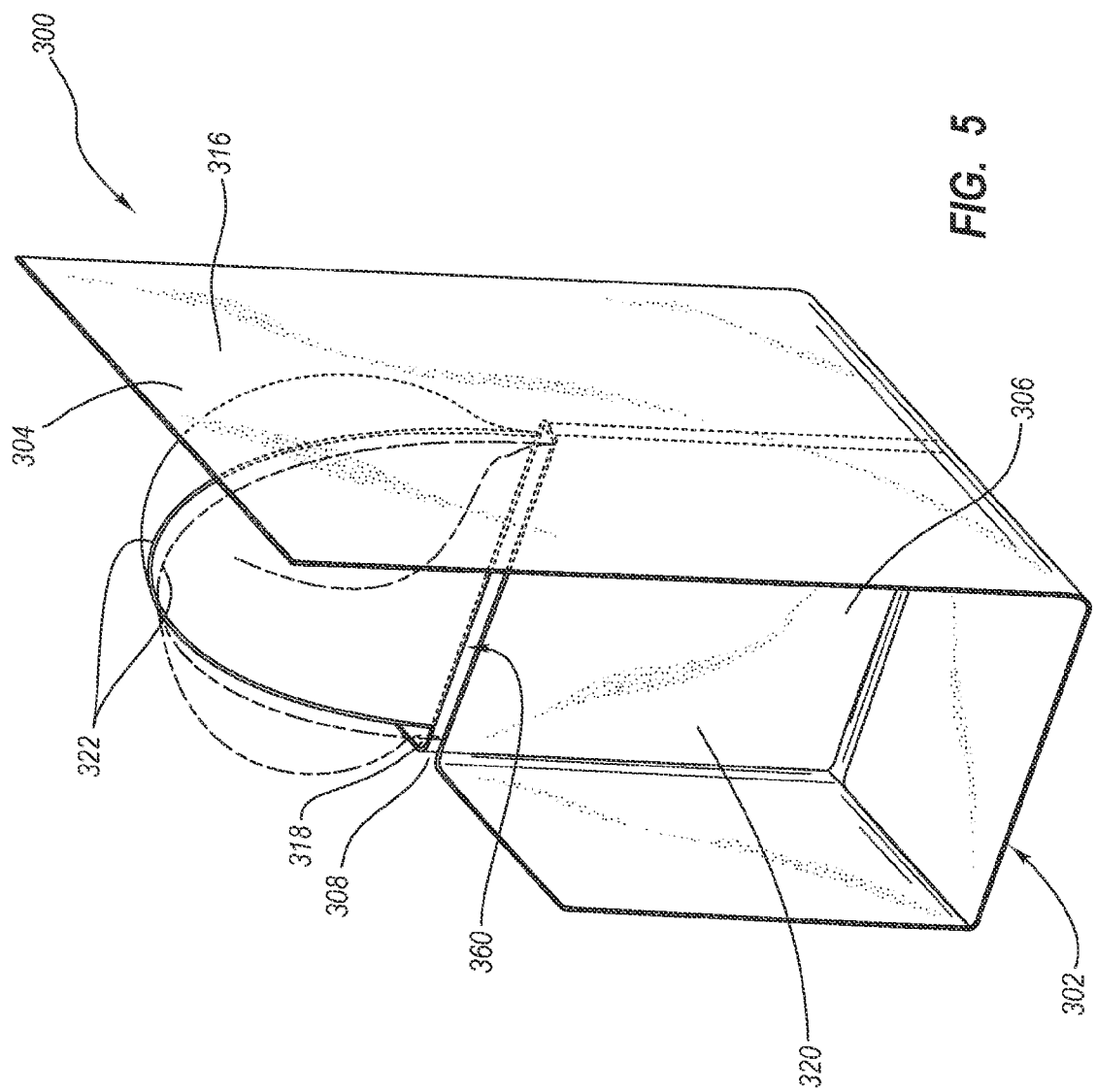
FIG. 5 is an alternative partially cut-away perspective view of the divided airbag of FIG. 4.

FIG. 5 represents the divided airbag system 300 of FIG. 4, shown from an alternative partially cut-away perspective view. The view of FIG. 5 is shown from the perspective of the front panel 316 toward the rear panel 318 absent the sides of the inflatable cushion 302. According to the embodiment depicted in FIG. 5, the front panel 316 is solid and covers the recess 308 and the split pocket 360, such that the recess 308 and the split pocket 360 are disposed behind the front panel 316. In other embodiments the recess 308 may extend through the front panel 316.

The divider panels 320 that define the recess 308 may be attached to the front panel 316 through various types of fastening mechanisms, such as through stitching. The top edges 322 of the divider panels 320 may also be merged through stitching to limit the recess 308 to the lower portion 306 of the cushion 302, i.e., so that the recess 308 does not extend completely through the upper portion 304 and divide the cushion 302 completely in half.

Figure 6:
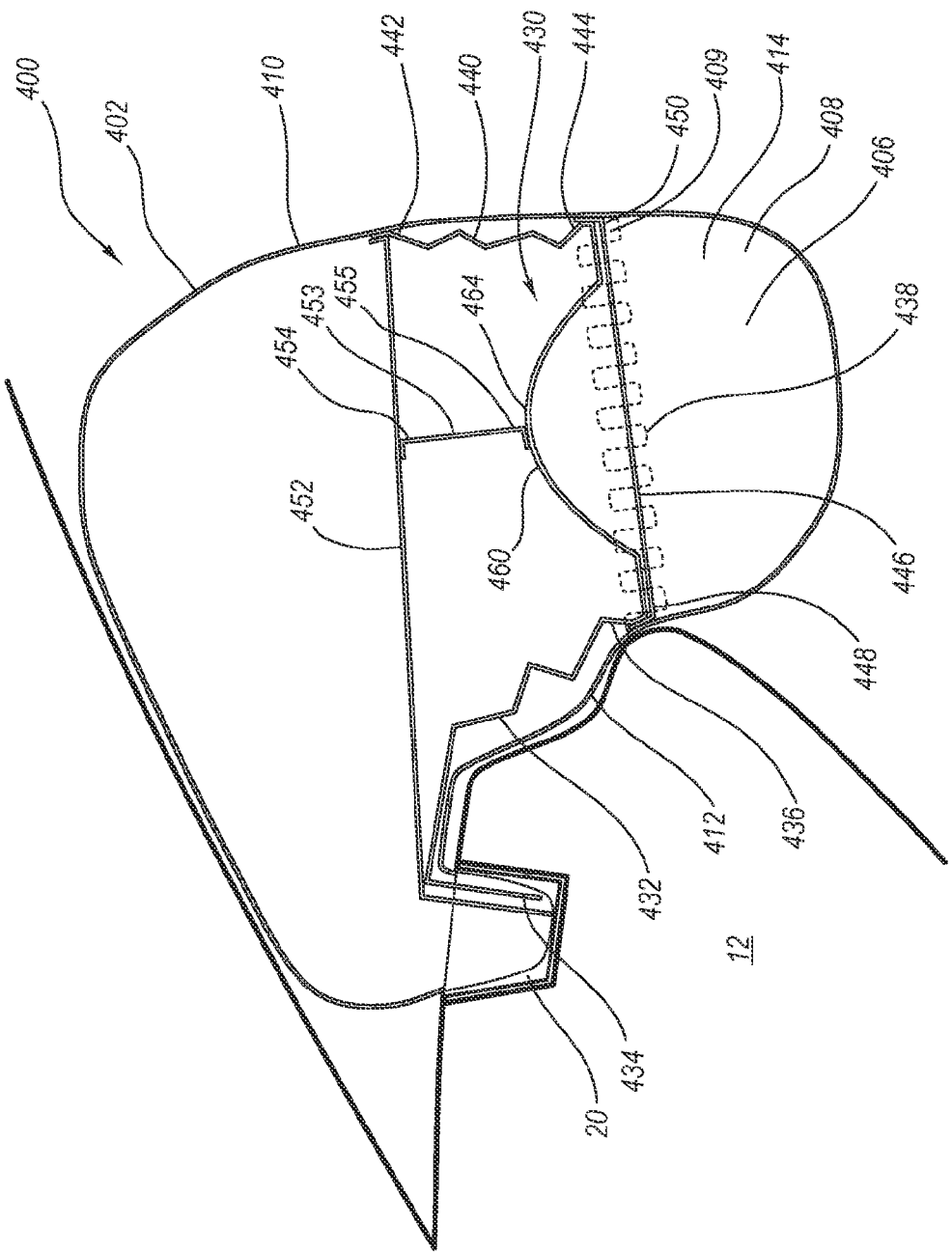
FIG. 6 is a side cross-sectional view of an embodiment of an airbag assembly in a deployed state.

FIG. 6 represents an embodiment of an airbag assembly 400 in a deployed state as shown from a side cross-sectional view. The airbag 400 comprises an inflatable cushion 402 that may deploy out of an instrument panel 12 toward an intended occupant position that may be in a passenger seat. The airbag 400 may be stored inside a cavity 20 in the instrument panel 12 when in an uninflated state.

As discussed in the embodiments heretofore described, the cushion 402 has a recess 408 in its lower portion 406. The recess is configured to receive a portion of a rear-facing child car seat, the head of an occupant in the car seat, and/or a portion of the car seat occupant's upper body once the cushion 402 is inflated. Recess 408 also defines split sections 414 (shown below stitching 438) in the lower portion 406 of the airbag cushion 402. Recess 408 is defined by a top portion 409, which may comprise a piece of material sewn between split sections 414, the attachment of divider panels (not shown) to each other, or as previously described herein. In order to control the deployment of the inflating cushion 402, and particularly the inflation of the split sections 414 in the lower portion 406, the airbag assembly 400 may include a tethering system 430.

The tethering system 430 may be an internal tethering system, such that the tethers used to control the deployment of the cushion 402 are located in the interior of the cushion 402. Alternatively, tethers external to the cushion 402 could be used, or a combination of internal tethers and external tethers. Furthermore, according to other embodiments, the cushion 402 may be constructed such that no tethering system is needed.

The tethering system 430 may include a first tether 432. The first tether 432 may be internal to the airbag cushion 402 and may have a first end 434 that is attached adjacent a rear face 412 of the cushion 402. Being attached adjacent the rear face 412 indicates that the first end 434 of the first tether 432 may be attached directly to the rear face 412 through stitching, bonding, RF welding and the like, or alternatively, the first end 434 may be attached to some other structure that is next to the rear face 412 of the cushion 402. The first end 434 of the first tether 432 is attached adjacent the rear face 412 in a location above the split sections 414 disposed in the lower portion 406 of the cushion 402.

The first tether 432 has a second end 436 that is attached adjacent the rear face 414 and adjacent the split section 414. Being attached adjacent the split section 414 indicates that the second end 436 of the first tether 432 may be attached to a portion of the split section 414, or alternatively next to the split section 414, or as depicted in FIG. 6, attached at the point where the split section 414 ends at the stitching 438. The first tether 432 may help control the trajectory of the deploying airbag cushion 402, particularly in helping to keep the bottom or lower portion 406 from bulging downward during deployment.

Referring still to FIG. 6, the airbag assembly 400 may also include a second tether 440. The second tether 440 may also be internal to the airbag cushion 402 and has a first end 442 that may be attached adjacent (including directly to) a front face 410 of the cushion 402. The first end 442 may be attached to the front face 410 at a position above the split sections 414 disposed in the lower portion 406 of the cushion 402.

The second tether 440 has a second end 444 that is also attached adjacent to the front face 410 and adjacent the split section 414. The second end 444 may be attached at the point where the split section 414 ends adjacent the stitching 438. Alternatively, the second end 444 may be attached to a portion of the split section 414, or next to the split section 414 as would be apparent to those having skill in the art. The second tether 440, like the first tether 432, may help control the trajectory of the deploying airbag cushion 402, particularly in keeping the bottom or lower portion 406 from bulging downward during deployment.

The tether system 430 of the airbag assembly 400 may further include a third tether 446. The third tether 446 may be internal to the inflatable cushion 402. The third tether 446 has a first end 448 that may be attached to the rear face 412 adjacent the split portion 414. The first end 448 of the third tether 446 may be attached adjacent the rear face 412 at the same location that the second end 436 of the first tether 432 is located adjacent the rear face 412.

The third tether 446 has a second end 450 that may be attached to the front face 410 adjacent the split portion 414. The second end 450 of the third tether 446 may be attached adjacent the front face 410 at the same location that the second end 444 of the second tether 440 is located adjacent the front face 410. Accordingly, the third tether 446 may interconnect the first and second tethers 432, 440. The third tether 446 may also be attached to or adjacent to the split portions 414 through stitching 438.

The first 432, second 440 and third 446 tethers may be considered first, second and third tether segments. Furthermore, the first 432, second 440 and third 446 tethers may be integrated into a single tether. For example the single tether may have a first end that is equivalent with the first end 434 of the first tether 432 and a second end that is equivalent with the first end 442 of the second tether 440. All other "ends" of each tether may be points where the single tether is attached to the front 410 or rear face 412 of the cushion 402.

Referring still to FIG. 6, the tethering system 430 may also include a fourth tether 452. The fourth tether 452 may be a typical internal tether that may be attached to and interconnects the rear face 412 and the front face 410 above the lower portion 406 of the cushion 402 to control deployment and the shape of the inflated cushion 402. The tethering system 430 may include other tethers or alternative tether configurations from those shown in FIG. 6 as would be apparent to those having skill in the art.

Airbag assembly 400 may further comprise a split pocket 460 with its own tether 453, which can be considered a component of tethering system 430. Split pocket 460 may be configured as previously described herein, and in the embodiment of FIG. 6, is configured such that second and third tethers 440 and/or 446 run on a side of pocket 460 such that they do not cover an opening of split pocket 460. Pocket 460 may comprise a top portion 464, which is defined by a piece of material. Tether 453 is configured to support split pocket 460 during and after deployment so that the split pocket does not become inverted. A first portion 454 of pocket tether 453 may be attached to fourth tether 452, or alternatively, front or rear panels 410 and 412. Alternatively, tether 453 may be attached to any other suitable surface or component of airbag assembly 400. A second portion 455 of pocket tether 453 is attached to top portion 464 of pocket 460. First and second portions 454 and 455 may be attached using any of the techniques heretofore disclosed. In an alternative embodiment, first portions 434 and 442 of first and second tethers 432 and 440 may be coupled to third tether 452 near the point where pocket tether 453 is coupled to the third tether, wherein the second portions 436 and 444 of the first and second tethers are configured as depicted.

Figure 7:
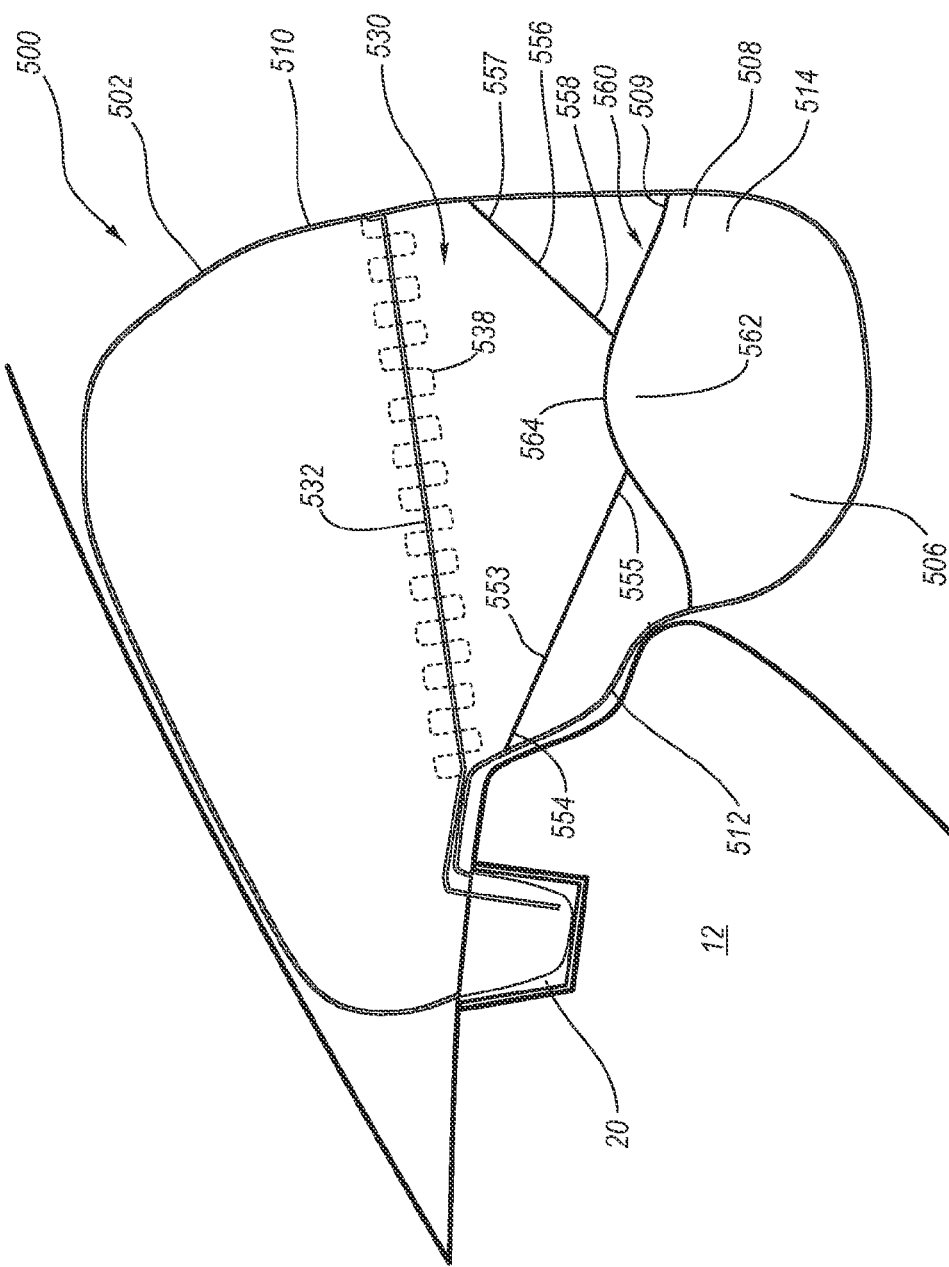
FIG. 7 is a side cross-sectional view of an alternative embodiment of an airbag assembly in a deployed state.

FIG. 7 represents another embodiment of an airbag assembly 500 as shown from a side cross-sectional view in a deployed state. Like the embodiment disclosed in conjunction with FIG. 6, the airbag assembly 500 of FIG. 7 comprises an inflatable cushion 502 that may deploy out of an instrument panel 12 toward an intended occupant position that may be in a passenger seat. The airbag 500 may be stored inside a cavity 20 in the instrument panel 12 when in an uninflated state.

The airbag assembly 500 may include a tethering system 530 that is of an alternative configuration from the tethering system 430 disclosed in conjunction with the embodiment described in FIG. 6. The tethering system 530 may include a first tether 532 that interconnects and is attached to a rear face 512 and a front face 510 of the inflatable cushion 502.

The first tether 532 may extend adjacent split sections 514 in a lower portion 506 of the cushion 502. The first tether 532 may be attached adjacent the split section 514 through a fastener such as stitching 538. The lower portion 506 and split section 514 of the cushion 502 is disposed below the stitching 538. Accordingly, the split section 514 of the embodiment disclosed in FIG. 7 may have an alternative depth than the embodiment disclosed in FIG. 6.

FIG. 7 also depicts a split pocket 560 as well as first and second pocket tethers 553 and 556. Split pocket 560 may be configured as previously described herein such that an opening 562 of pocket 560 is at least partially defined by recess 508. Recess 508 is partially defined by an upper portion 509, which may be partially cut away to form pocket 560.

First and second pocket tethers 553 and 556 have first portions 554 and 557, which may be attached to a surface of cushion 502, such as the rear face 512 or the front face 510. Tethers 553 and 556 also have second portions 555 and 558 which are attached to a top portion 564 of pocket 560. The tether attachments may be made using techniques disclosed above. Tethers 553 and 556 may be considered to be components of tethering system 530.

Figure 8:
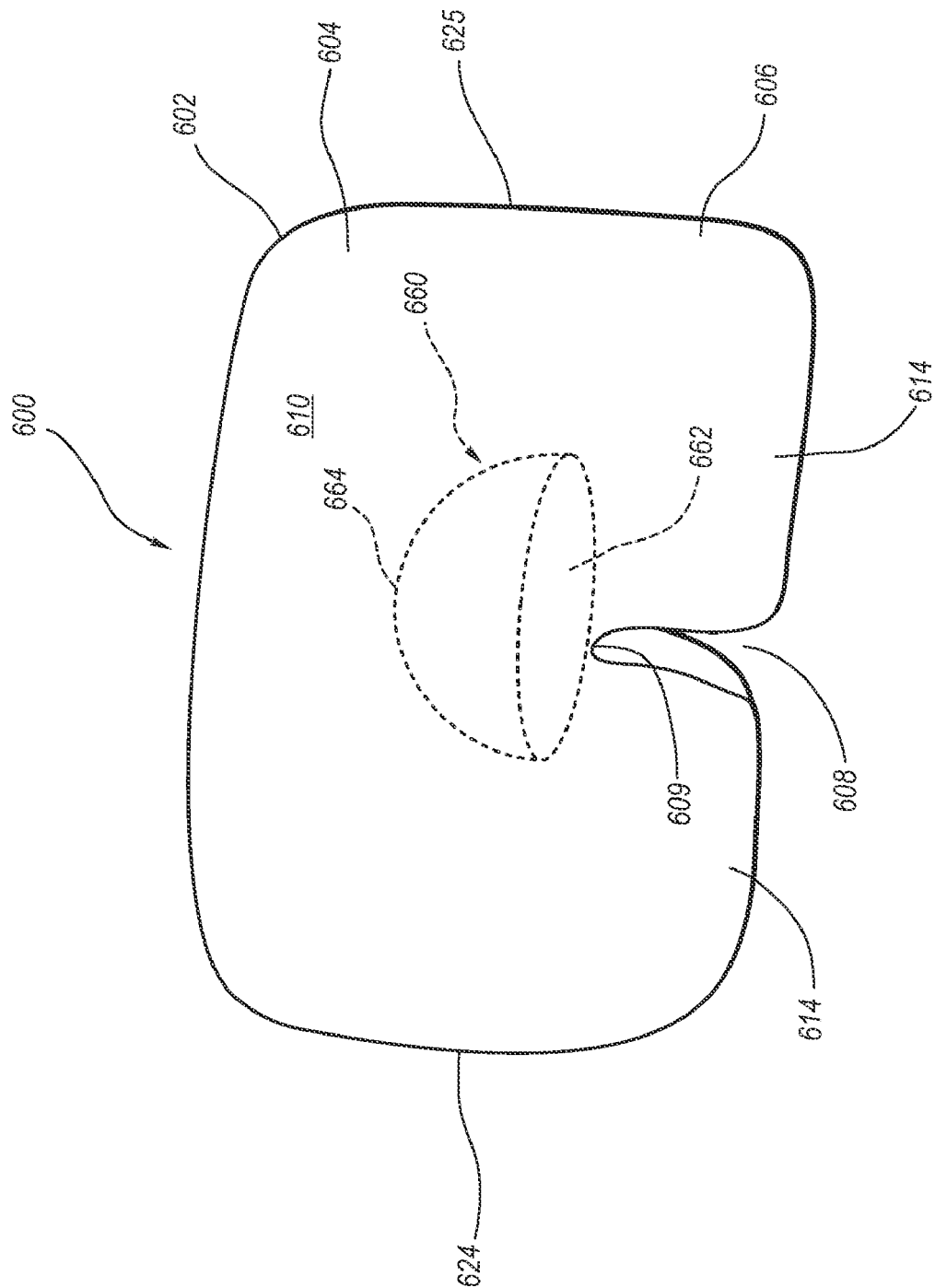
FIG. 8 is a perspective view of an embodiment of an airbag assembly in a deployed state.

FIG. 8 depicts another embodiment of an airbag assembly 600, which, like those disclosed above, is configured to be mounted in an instrument panel in a vehicle. Assembly 600 comprises an airbag cushion 602, which has an upper portion 604, a lower portion 606, and a front face 610. A recess 608 is formed in lower portion 606 and defines split portions 614. Recess 608 comprises an upper portion 609 which extends to an opening 662 in a split pocket 660.

Split pocket 660 may be configured similarly to and may function similarly as those described herein, however, the split pocket of FIG. 8 is oriented along a different axis than the previously described pockets. Specifically, pocket 660 is oriented such that the long axis of the pocket is oriented substantially parallel with front face 610 and perpendicular to inboard and outboard sides 624 and 625.

Figure 10:
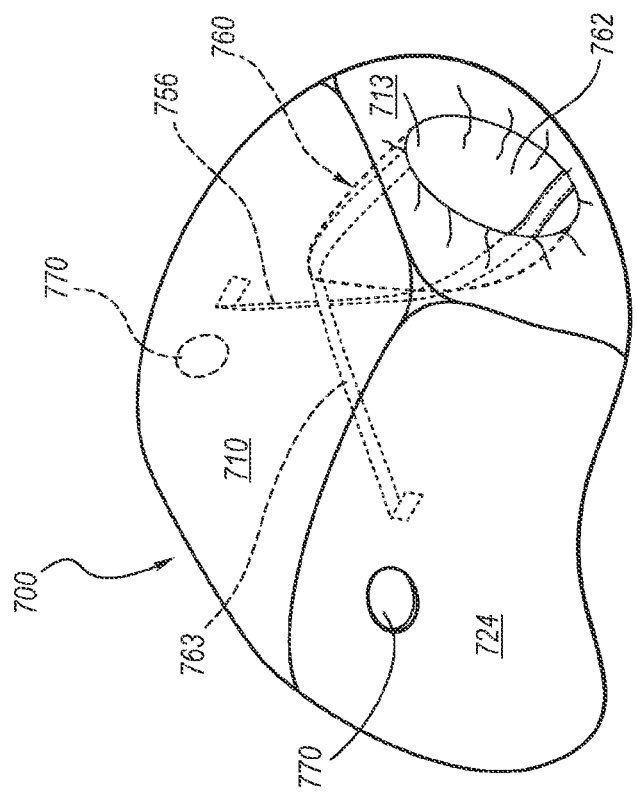
FIG. 10 is a different perspective view of the airbag assembly of FIG. 9 in a deployed state.
Figure 9:
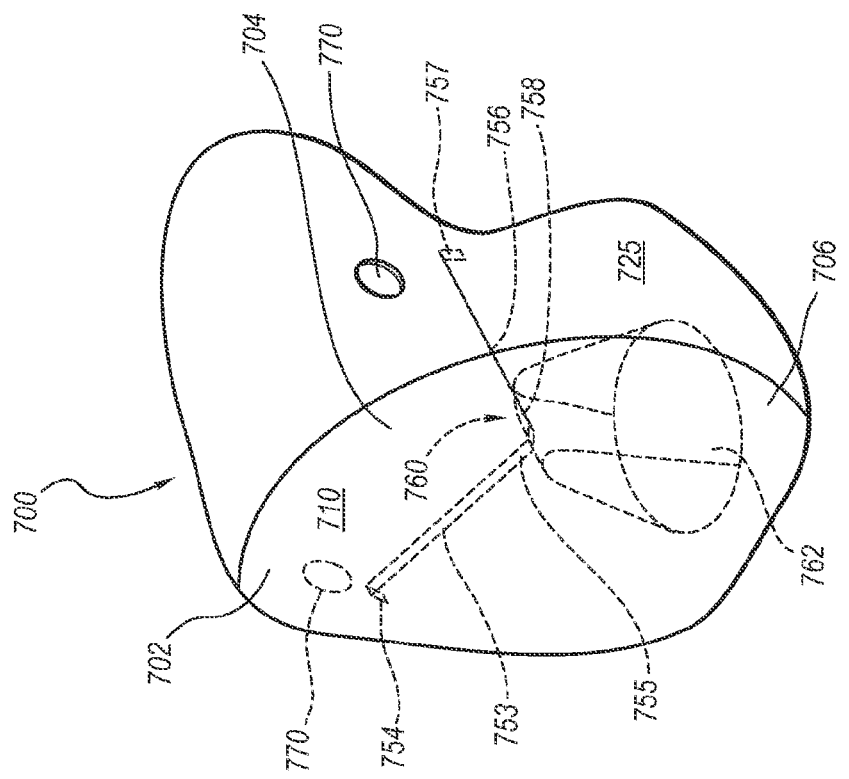
FIG. 9 is a perspective view of an embodiment of an airbag assembly, in a deployed state, wherein the airbag comprises a split pocket.

FIGS. 9 and 10 depict another embodiment of an airbag with a split pocket from a perspective view. Assembly 700 is configured to be mounted in a vehicle and to function similarly as the airbags previously disclosed. With reference now to FIGS. 9 and 10, simultaneously, several features of airbag assembly 700 will be discussed. Airbag assembly 700 has an airbag cushion 702 with a front face 710, a bottom face 713, an inboard face 724, an outboard face 725, an upper portion 704 and a lower portion 706.

A split pocket 760 is disposed in lower portion 706 and is configured to receive a child car seat or a car seat occupant's head and/or upper body, as disclosed above. An opening 762 of split pocket 760 is disposed on bottom face 713, and projects into cushion 702 such that an interior space is defined within pocket 760. Opening 762 may partially be defined by an oval shaped cut-out of bottom face 713, or alternatively, cushion 702 may be manufactured such opening 762 is inherent in cushion 702. The shape of opening 762 may vary according to different manufacturing techniques and different cushioning applications.

Pocket 760 may comprise one or more pieces of material sewn into cushion 702, and is depicted as having a triangular cross section, but the shape of the pocket may vary. Pocket 760 may extend the full length from the front face 710 to a rear face of cushion 702, or alternatively, may only extend a portion of the full length of the cushion from front to back. Pocket 760 is disposed between front face 710 and a rear face (not shown) of cushion 702. In this embodiment, a seam that at least partially defines opening 762 is substantially airtight and side portions 768 of pocket 760 may not be attached to cushion 702. In alternative embodiments, side portions 768 may also be attached to front and back faces 710 and 712 in an airtight manner. In this alternative embodiment, front and rear faces 710 and 712 may be cut-out to correspond with the shape of side portions 768. Thus, in some embodiments, pocket 760 may extend from the front to back of cushion 702, including the front and rear faces 710 and 712.

Pocket 760 may be held in place during deployment by first and second tethers 753 and 756, but cushion 702 may be manufactured such that pocket 760 holds its shape during deployment without using tethers. Tethers 753 and 756 comprise first portions 754 and 757, which are attached to inboard and outboard faces 724 and 725 of cushion 702. Tethers 753 and 756 also comprise second portions 755 and 758, which are attached to top portion 764 of pocket 760. The tethers can be attached to cushion 702 and pocket 760 by any of the techniques disclosed above, including by stitching. First portions 754 and 757 may be attached to any suitable component of assembly 700 or portion of cushion 702. Further, the second portions 755 and 758 may be attached to any suitable component of 760

Cushion 702 may also have at least one vent 770, but more typically, at least two vents. The position, size and shape of vents 770 depicted in the figures are strictly for illustrative purposes and may vary. Vents 770 may be of one or more types, including discrete vents and dynamic vents, both of which are well known to one skilled in the art.

U.S. Patent Publication No. 2007/0216146, which corresponds with U.S. patent application Ser. No. 11/589,316 discloses some examples of different types of vents. Application Ser. No. 11/589,316 is hereby incorporated by reference in its entirety.

Discrete vents do not vary in their ability to vent inflation gas from an interior of an airbag to an exterior of the airbag during the course of deployment. Dynamic vents do vary in their ability to vent gas during deployment. For example, a dynamic vent may be deployed in an at least partially open configuration and then become closed upon full deployment, but if the airbag encounters an obstruction such as an out of position occupant or child car seat, the dynamic vent remains open. Additionally, the dynamic vent may initially be in an at least partially closed configuration, and then become at least partially open during deployment, and then become at least partially closed upon full deployment. Dynamic vents are typically coupled to a cord or tether which is initially slack but is put under tension during full deployment such that the cord pulls closed the dynamic vent. If the airbag encounters an out of position occupant, the cord is not put under tension, so that the vent does not close.

FIG. 11A depicts a piece of material 761 that may form pocket 760. Material 761 might be the same type of material from which cushion 702 is formed, which is often nylon. In the depicted embodiment, material 761 comprises opposing top and bottom edges 763 and opposing left and right sides 766, such that the piece of material is bilaterally symmetrical. In an alternative embodiment, piece of material 761 may be asymmetrical, depending on cushion geometry. Top and bottom edges 763 may comprise flanges 765, but the flanges are optional. A midline is depicted and a length L is shown, which is the distance from one of the opposing edges 763 to the midline. The piece of material 761 can be folded over to form pocket 760, as depicted in FIG. 11B.

FIG. 11B depicts the piece of material 761 from FIG. 11A from a perspective view after it has been folded. Material 761 is in the conformation which can be attached to cushion 702 to form pocket 760, wherein the material can be attached to the cushion by employing any technique known in the art including sewing, RF welding, and gluing. The fold at the midline depicted in FIG. 11A becomes top portion 764, and opposes opening 762. Each side 766 forms a roughly triangular shape, which comprises side portions 768. The length of side portions 768 and thus the depth of pocket 760 may be adjusted by varying the length L, depicted in FIG. 11A. Side portions 768 may be sewn together, or optionally may be closed off by sewing a complementary shaped piece of material over them. Flanges 765 may be coupled together to form the oval shaped opening 762.

In the depicted embodiment, material 761 has a generally rectangular shape with flanges, and pocket 760 has a triangular transverse cross section and a generally rectangular longitudinal cross section. The depicted shapes may comprise a configuration that is easier to manipulate and form into a pocket disposed within an airbag compared to other shapes; however, a piece of material comprising any one of a number of shapes may be used to form a pocket in an airbag. As such, the shape and cross sectional characteristics of the pocket can vary greatly from that depicted in the figures. For example, the material may be folded more than once to form the pocket; the material may comprise a generally round or oval shape; the material may be wider or shorter than depicted. Further, the one or more folds in the material may not be at the midline of the material.

Figure 12:
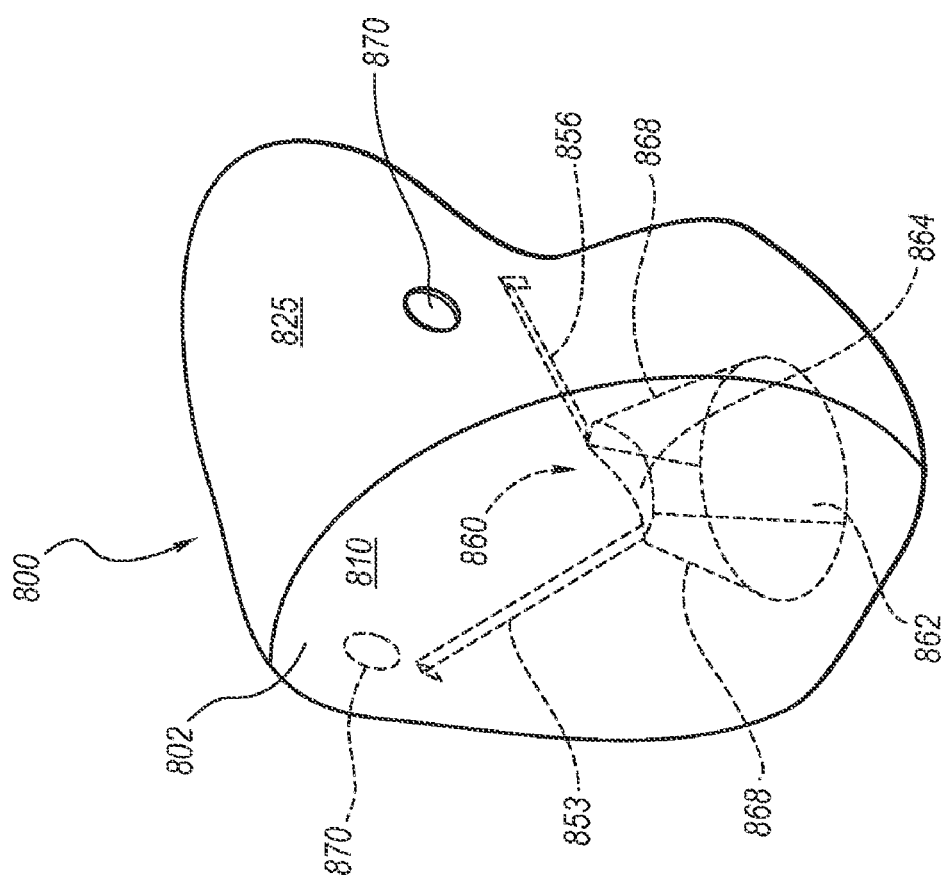
FIG. 12 is a perspective view of an embodiment of an airbag assembly in a deployed state.

FIG. 12 depicts another embodiment of an airbag assembly 800 from a perspective view. Airbag assembly 800 may be mounted in a vehicle, and configured to function similarly as assembly 700. Assembly 800 has an airbag cushion 802 that has a front face 810 and an outboard side 825, and may comprise at least one vent 870. Vents 870 may be as described for vents 770, and might be discrete, dynamic, or a combination of the two.

A split pocket 860 is disposed within cushion 802, and the pocket may be configured to function similarly as those disclosed above, but the shape of the pocket 860 varies from those previously disclosed. Top portion 864 of pocket 860 is extended in a direction of an outboard side 825 and an opposing inboard side of cushion 802, as compared to top portion 764, most clearly depicted in FIG. 11B. The shape of side portions 868 may be said to be that of an isosceles trapezoid, or in alternative embodiments, a trapezium.

The shape of pocket opening 862 may be oval as previously described, but need not be limited to an oval shape. A long axis of opening 862 is oriented roughly parallel to inboard and outboard sides of cushion 802, but in alternative embodiments, the long axis may be oriented roughly perpendicularly to the inboard and outboard sides.

Split pocket 860 may be held in place by first and second tethers 853 and 856, which can be configured the same as tethers 753 and 756, discussed above. Cushion 802 may be configured such that pocket 860 does not need tethers 853 and 856 to maintain its shape during deployment. Additionally, a single tether may be coupled to pocket 860 wherein the tether is attached at one or more places on the pocket, such as the left and/or right side, including the top portion of the pocket.

The tethering systems 430, 530, tethers 753, 756, 853, 856 and cushions 102, 202, 302, 402, 502, 602, 702, 802 disclosed provide for a pocket with or without a recess that may receive an upper portion of a rear-facing child car seat, and the head of an occupant seated therein. By having the upper portion of the cushion not divided also provides for adequate restraint and impact protection for properly seated (in-position) occupants.

The airbags and inflatable cushions disclosed herein are examples of means for cushioning a vehicular occupant during a collision event. Furthermore, the divider panels, stitching patterns and recesses of the inflatable cushions disclosed are examples of means for dividing a lower portion of the cushioning means to permit objects such as a rear-facing child car seat to be disposed between divided sections of the cushioning means during deployment. The tethering systems disclosed herein are to be considered examples of tethering means for controlling placement of the receiving means during airbag deployment.

Without further elaboration, it is believed that one skilled in the art can use the preceding description to utilize the invention to its fullest extent. The examples and embodiments disclosed herein are to be construed as merely illustrative and not a limitation of the scope of the present invention in any way. It will be apparent to those having skill in the art that changes may be made to the details of the above-described embodiments without departing from the underlying principles of the invention. In other words, various modifications and improvements of the embodiments specifically disclosed in the description above are within the scope of the appended claims. Note that elements recited in means-plus-function format are intended to be construed in accordance with 35 U.S.C. §112 ¶6. The scope of the invention is therefore defined by the following claims.

The invention claimed is:

1. An airbag assembly, comprising:
   an inflatable cushion having an upper portion and a lower portion;
   a structure formed in the cushion creating a recess in the cushion, such that once the cushion is inflated, the recess exists in the lower portion of the cushion, thereby forming a split section in the lower portion of the cushion, wherein the cushion, once inflated, has a front face and a rear face and the recess extends at least a portion of the distance from the front face to the rear face; and
   a pocket formed from at least one piece of material that is coupled to a cut-out portion of the recess such that the pocket comprises an elongated opening that is contiguous with the recess, the pocket defining a void that extends a portion of the distance from the front face to the rear face of the airbag cushion and adds depth to the recess in a direction that is approximately parallel to the front face of the airbag cushion,
   wherein the pocket extends the depth of the recess while allowing the cushion to maintain a predetermined conformation during deployment, and
   wherein, when the cushion is deployed, a top portion of the pocket is fully disposed behind a front surface of the cushion and the opening of the pocket is distanced from a base of the cushion.

2. The airbag assembly of claim 1 further comprising an internal tethering system configured to control deployment of the split section and the pocket of the cushion,
   wherein the internal tethering system comprises a first tether segment attached adjacent to the rear face of the inflatable cushion above the split section, the first tether segment also attached adjacent to the split section, and adjacent to the rear face, the first tether segment disposed adjacent to the opening in the pocket.

3. The airbag assembly of claim 2, wherein the pocket comprises a cross section that is approximately oval in shape.

4. The airbag assembly of claim 3, wherein the elongated opening is oriented perpendicular to the front face.

5. The airbag assembly of claim 3, wherein the elongated opening is oriented parallel to the front face.

6. The airbag assembly of claim 1, wherein the pocket and the recess are configured to receive a portion of a rear-facing child car seat once the cushion is inflated such that interaction between the inflatable cushion and a head of an occupant in the rear-facing child car seat is minimized.

7. The airbag assembly of claim 2, wherein the internal tethering system further includes a second tether segment attached adjacent to the front face of the inflatable cushion above the split section, the second tether segment also attached adjacent to the split section adjacent to the front face, the second tether segment configured such that it does not block the opening in the pocket.

8. The airbag assembly of claim 7, wherein the internal tether system further includes a third tether segment extending from the rear face to the front face adjacent the split section and interconnecting the first and second tether segments, the third tether segment configured such that it does not block the opening in the pocket.

9. The airbag assembly of claim 2, wherein the tether system comprises at least one pocket tether that has opposing first and second ends, the first end being coupled to a portion of the pocket, the second end of the tether being coupled to a surface of the cushion that is above the point at which the first end is coupled to the pocket.

10. An airbag assembly, comprising:
    an inflatable cushion having a front panel and a rear face, wherein the front panel is configured to be closest to an intended occupant position and opposite the rear face when the cushion is deployed, the inflatable cushion further having an upper portion and a lower portion;
    a pair of split sections in the lower portion of the inflatable cushion;
    a recess dividing the split sections from each other such that the split sections are configured to be deployed at either side of the recess; and
    a pocket at an upper end of the split sections and between the front panel and the rear face, wherein the pocket extends the recess while allowing the cushion to maintain a predetermined conformation during deployment, wherein the pocket extends the recess upward toward a top of the cushion and away from the split sections when the cushion is deployed, and wherein, when the cushion is deployed, a top portion of the pocket is fully disposed behind the front panel of the cushion and the opening of the pocket is distanced from a base of the cushion.

11. The airbag assembly of claim 10, wherein the recess extends from the rear face to the front face of the cushion when the cushion is deployed.

12. The airbag assembly of claim 10, wherein the front face of the cushion comprises a front panel extending from the upper portion of the cushion to the lower portion of the cushion, and wherein the recess extends through the front panel in only the lower portion of the cushion.

13. The airbag assembly of claim 10, wherein the front face of the cushion comprises a front panel, and wherein the front panel spans across the recess so as to interconnect the split sections.

14. The airbag assembly of claim 13, wherein additional panels define the recess, and wherein the additional panels are attached to the front panel.

15. The airbag assembly of claim 13, wherein the rear face of the cushion comprises a rear panel, and wherein the recess extends through the rear panel.

16. An airbag assembly, comprising:
    an inflatable cushion having a front panel and a rear panel, wherein the front panel is configured to be closest to an intended occupant position when the cushion is deployed, the inflatable cushion further having an upper portion and a lower portion;
    a pair of split sections in the lower portion of the inflatable cushion;
    a recess dividing the split sections from each other such that the split sections are configured to be deployed at either side of the recess;
    a pocket at an upper end of the split sections, wherein the pocket extends a depth of the recess while allowing the cushion to maintain a predetermined conformation during deployment, and wherein, when the cushion is deployed, a top portion of the pocket is fully disposed behind the front panel of the cushion and the opening of the pocket is distanced from a base of the cushion; and
    divider panels extending from a base of the cushion towards a top of the cushion, wherein the divider panels define at least a portion of the recess.

17. The airbag assembly of claim 16, wherein the divider panels define the split pocket.

18. The airbag assembly of claim 17, wherein top edges of the divider panels are attached to each other through stitching.

19. The airbag assembly of claim 16, wherein top edges of the divider panels are attached to each other through stitching.

20. The airbag assembly of claim 16, wherein the pocket is defined by material attached to the divider panels.

21. The airbag assembly of claim 16, wherein the front and rear panels comprise separate pieces of fabric.

22. The airbag assembly of claim 16, wherein the front and rear panels comprise opposite facing portions of a single fabric piece.

23. The airbag assembly of claim 16, wherein the front panel is solid in the lower portion of the cushion such that it covers the recess and the split pocket.

24. The airbag assembly of claim 1, wherein the pocket is widened during inflation of the cushion.

25. The airbag assembly of claim 10, wherein the pocket defines dimensions that change during inflation of the cushion.

26. The airbag assembly of claim 16, wherein the pocket is opened during inflation of the cushion.

* * * * *